United States Patent [19]

Cailey

[11] 3,996,824
[45] Dec. 14, 1976

[54] GROOVE CUTTER

[75] Inventor: Ronald J. Cailey, San Antonio, Tex.

[73] Assignee: Glass Master Sales and Leasing Corporation, San Antonio, Tex.

[22] Filed: Dec. 9, 1974

[21] Appl. No.: 523,156

[52] U.S. Cl. .................................. 83/5; 83/651
[51] Int. Cl.² .......................................... B26D 3/06
[58] Field of Search .................................. 83/5, 651

[56] References Cited
UNITED STATES PATENTS

| 532,822 | 1/1895 | Saltzkorn et al. | 83/5 |
| 667,055 | 1/1901 | Andersen | 83/5 X |
| 1,117,577 | 11/1914 | Johnson | 83/5 |
| 2,436,111 | 2/1948 | Lowe | 83/5 X |
| 2,565,400 | 8/1951 | Skeoch | 83/5 |
| 3,515,019 | 6/1970 | Tyer, Jr. | 83/5 |

Primary Examiner—Frank T. Yost
Attorney, Agent, or Firm—Vinson, Elkins, Searls, Connally & Smith

[57] ABSTRACT

There is disclosed a board cutting machine in which a plurality of grooves are cut in a board such as a board of insulating duct material to permit the board to be folded into a multi-sided shape. As strips are cut from the board an extractor unit extracts the scrap strips and directs them to a chopping unit where the scrap is chopped into small pieces.

2 Claims, 5 Drawing Figures

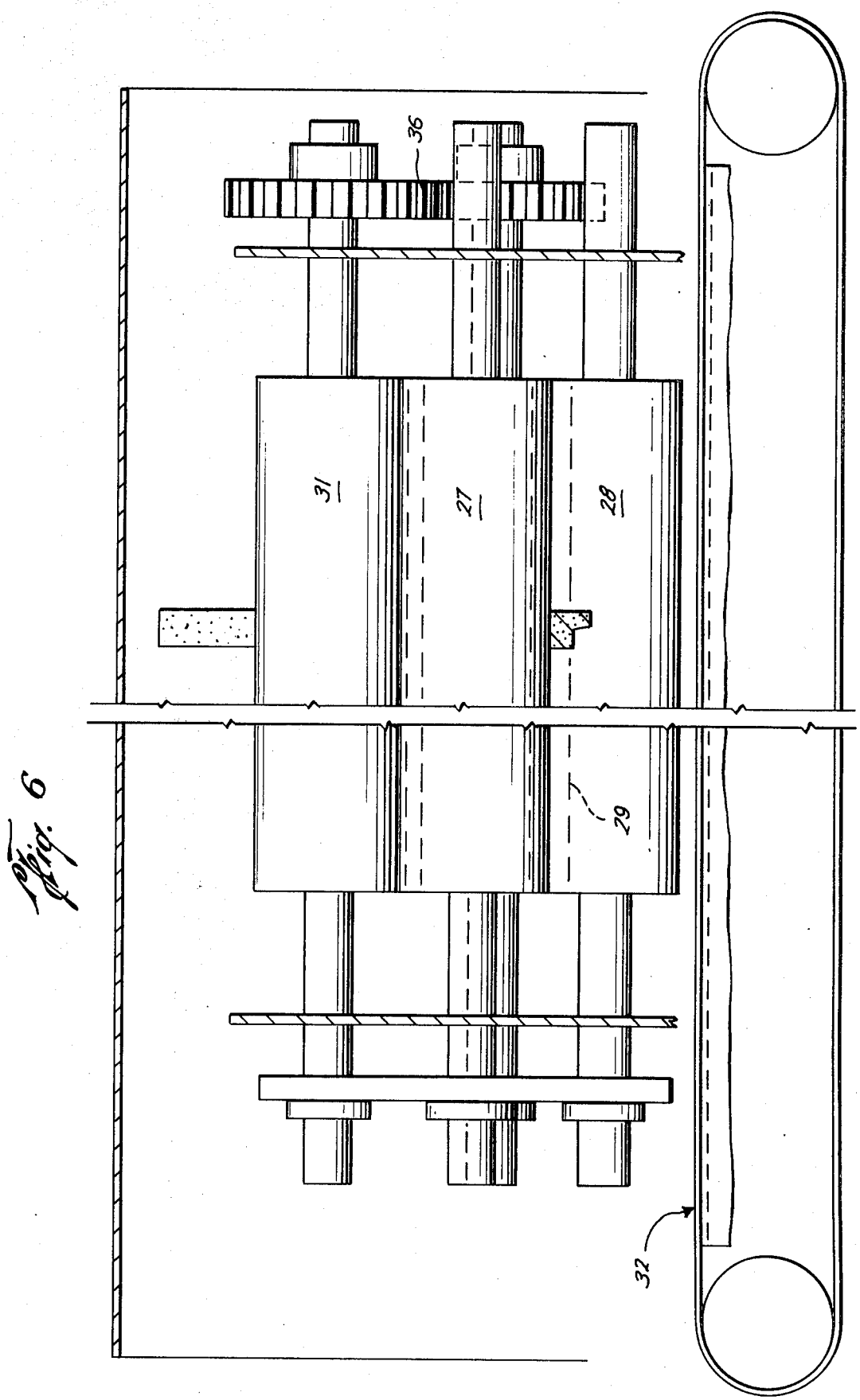

GROOVE CUTTER

This invention relates to board cutting machines, and more particularly to machines for cutting grooves in a piece of duct board so that it may be folded into a multi-sided form to provide a duct.

Board cutting machines for forming shiplap grooves in duct board are well-known. They are exemplified in the U.S. Pat. No. to Barr, 3,605,534 which is incorporated herein by reference. The cut strips leave the machine of Barr with the board and are manually extracted therefrom before the board is formed into a duct. It would be advantageous to have a machine for automatically removing the cut strips and reducing them to a form which can be readily handled.

It is an object of this invention to provide a board cutting machine in which the cut strips can be automatically removed and reduced to small pieces to facilitate handling or easily removed by hand after grooving.

Another object of this invention is to provide a board cutting machine in which the cutters may be adjustably positioned across the machine for automatically conveying the cut strips from any position across the machine to a chopping section where they are chopped into small pieces and delivered to a central location for further handling.

Another object is to provide a board cutting machine as in the previous object in which the cut strips of material are removed from the board immediately after it is cut and while the board is still passing through the machine.

Another object is to eliminate the undercutting characteristic of the machine of the Barr patent.

Another object is to reduce the force necessary to move a sheet of material through the machine of the Barr patent.

Other objects, features and advantages of this invention will be apparent from the drawings, the specification and the claims.

In the drawings wherein like reference numerals indicate like parts and wherein there is shown an illustrative embodiment of this invention;

The Barr patent identified above shows the general layout of the machine of this invention and illustrates how the several cutters are selectively positioned across the machine so that several shiplap grooves may be cut in the board to facilitate forming a duct from the board. Reference to this patent is made for a disclosure of the details of the machine and its operation, this invention being an improvement upon the machine illustrated in the Barr patent.

Figure 1:
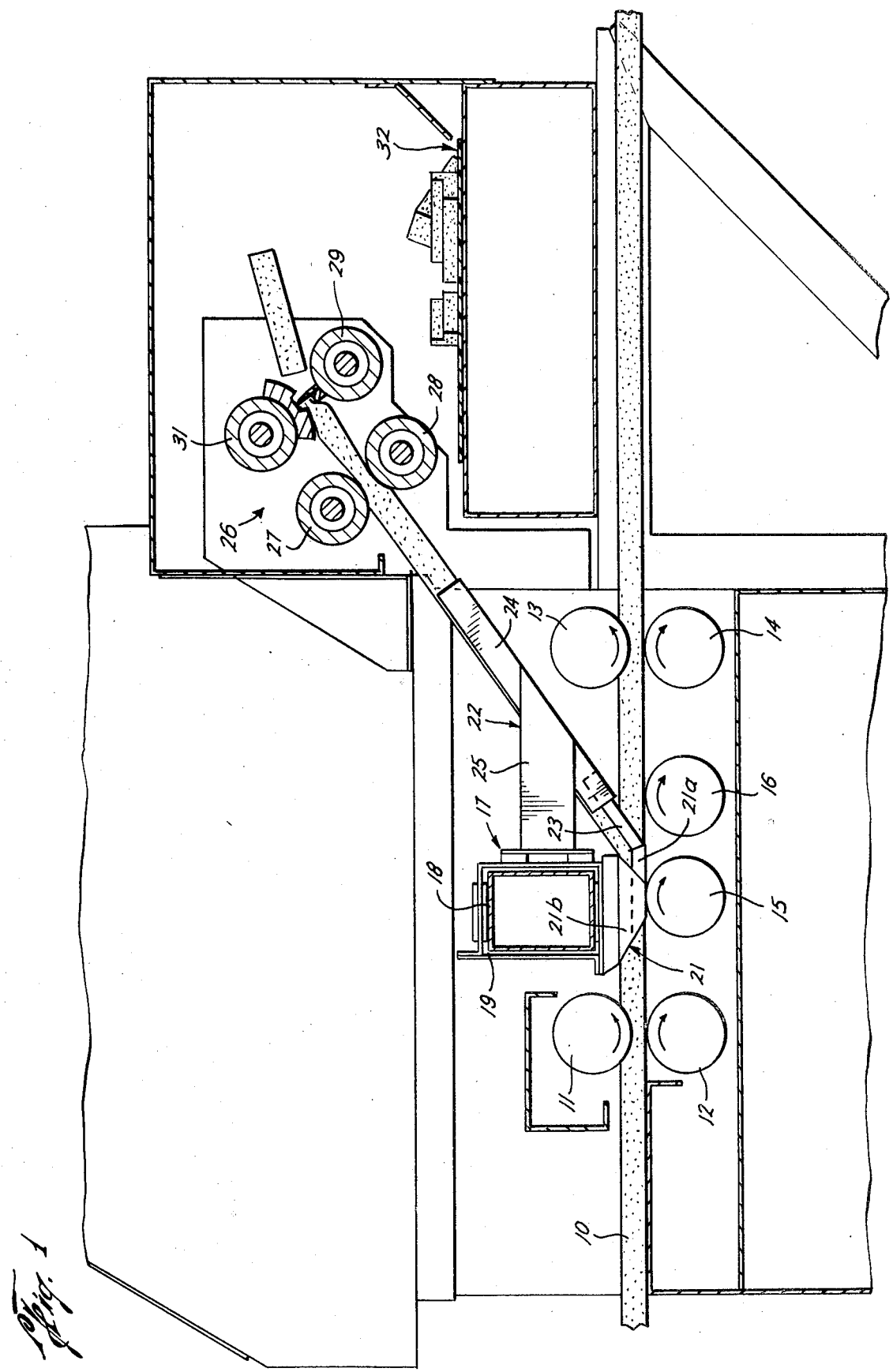
FIG. 1 is a schematic illustration of a machine constructed in accordance with this invention.

Referring first to FIG. 1, a sheet of duct board 10 is shown moving through the machine. The means for moving a board to be cut through the machine is provided by a pair of front pinch rollers 11 and 12 and a pair of rear pinch rollers 13 and 14. Also, rollers 15 and 16 are provided which support the board while it is being cut.

A cutting means is indicated generally at 17. The cutting means includes a plurality of blade supports and blades such as shown in FIG. 1. The cutting means includes a support bar 18 which extends across the machine and a plurality of blade supports 19 which are releasably locked to the bar 18 at the selected positions therealong.

Blade means indicated generally at 21 is provided on each blade support. As will be explained hereinafter, the cutting edge of the blade means when unstressed extends downwardly and inwardly toward the strip being cut at a slight angle to the vertical, causing the cut strip sides to be angled, facilitating removal of cut strip. If the blade cutting edge which extends in a vertical direction is vertical when unstressed, it has been found that the blade will make an undercut which tends to make the cut strip difficult to extract from the board.

Figures 2, 4:
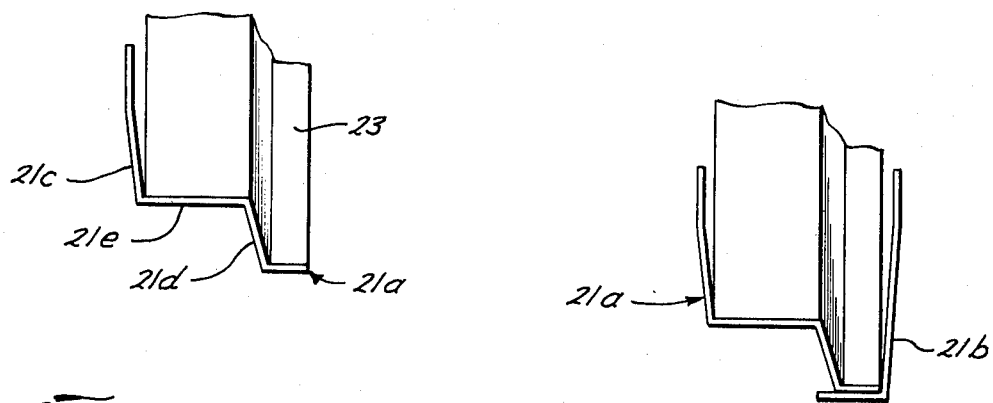
FIGS. 2 and 3 are end views of blades for use with the machine of this invention.
FIG. 4 is an end view of the blades shown in FIGS. 2 and 3 in their assembled position.

An extractor means indicated generally at 22 is carried by each blade support and lifts the cut strip from the board as it is being cut. As shown in FIG. 1, the extractor means includes a short lifter section 23 which may be integral with the rear of blade 21a and extends in an upward direction. Preferably, the lifter section 23 is fabricated with the general cross-sectional configuration of the blade 21a to which it is attached. With some configuration of blades the extractor need not be attached to the blade. Where the material being cut tends to hang up on the extractor it is secured to the blade as shown in FIGS. 1 and 2. This short section 23 forces the cut strip of board in an upwardly direction into the chute section 24 of the extractor means. The chute section 24 is preferably carried on arm 25 which is in turn carried directly by the blade support.

The extracted strips of board are conveyed to a chopping means indicated generally at 26 which includes extractor rollers 27 and 28 and cooperating blade roller 29 and base roller 31 which chop the extracted strip into short sections. The sections fall onto the conveyor indicated generally at 32 which conveys all of the scrap to a central location for easy handling.

Figure 3:
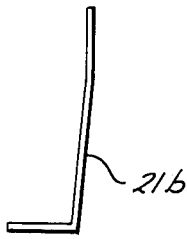

The blade indicated generally at 21 is made up of two parts which are shown in FIGS. 2 and 3. The blade 21a as shown in FIG. 2 includes two almost vertical sections 21c and 21d. It will be noted that blade section 21c is bent so that its cutting portion is preferably approximately 5° from the vertical. Blade section 21d is bent so its cutting section is preferably approximately 15° from the vertical. These blade sections depart from the vertical in a downwardly direction toward the strip being cut as it has been found that the cutting action will result in the material being cut bending back to substantially a vertical position. The angular relationship of these vertical blade sections with the vertical which for purposes of this description is assumed to be normal to the face of the board 10, are not critical, but should be such that no undercut is made which would make it difficult to extract the cut strip from the board. The vertical section 21d is joined to horizontal section 21e and to horizontal section 21f, forming an integral blade. It has been found that section 21d should have a greater angle than 21c, to prevent an undercut, causing difficulty in removal of the cut strip. The reason for this is not known. At any given point on the board the material being cut by a blade such as is shown in FIG. 4 has already been cut free from the board by blade section 21c and blade 21b before blade section 21d begins its cut. It is believed that this results in the strip being cut tending to turn under forces imposed by the blade.

It has been found that less force is required to cut a strip from a board if all undercutting is avoided. In force tests between blades of the form of FIG. 4 which were similar in shape except for the angled sections as taught herein to avoid undercutting it was found that angling the blades as taught herein reduced the force required to cut out a strip by 27 percent.

The extractor member 23 is also shown in FIGS. 2 and 4 and it will be noted that the extractor member is step-like in configuration and attached directly to the rear of blade section 21a. As noted above, it need not be attached in all forms of blades. The joint between the blade 21a and the chute section 23 should be such that the scrap strip will move smoothly into the chute. Thus, cut material passing over the blade 21a will be directed in an upwardly direction to the chute 24 (FIG. 1).

FIG. 3 shows the blade 21b to also be bent at about a five degree angle so that it will not undercut during use.

FIG. 4 shows schematically the relationship of the two blades 21a and 21b, in the installed condition. From FIG. 1 it will be apparent that the blade section 21b has its lower horizontal run in front of the comparable lower horizontal run of the blade 21a. The configuration of the deflector 23 is not critical and might be any shape which will deflect the cut-out section of board upwardly. Preferably, the cross-section is similar to the blade configuration so the cut strip will be removed smoothly.

Figure 5:
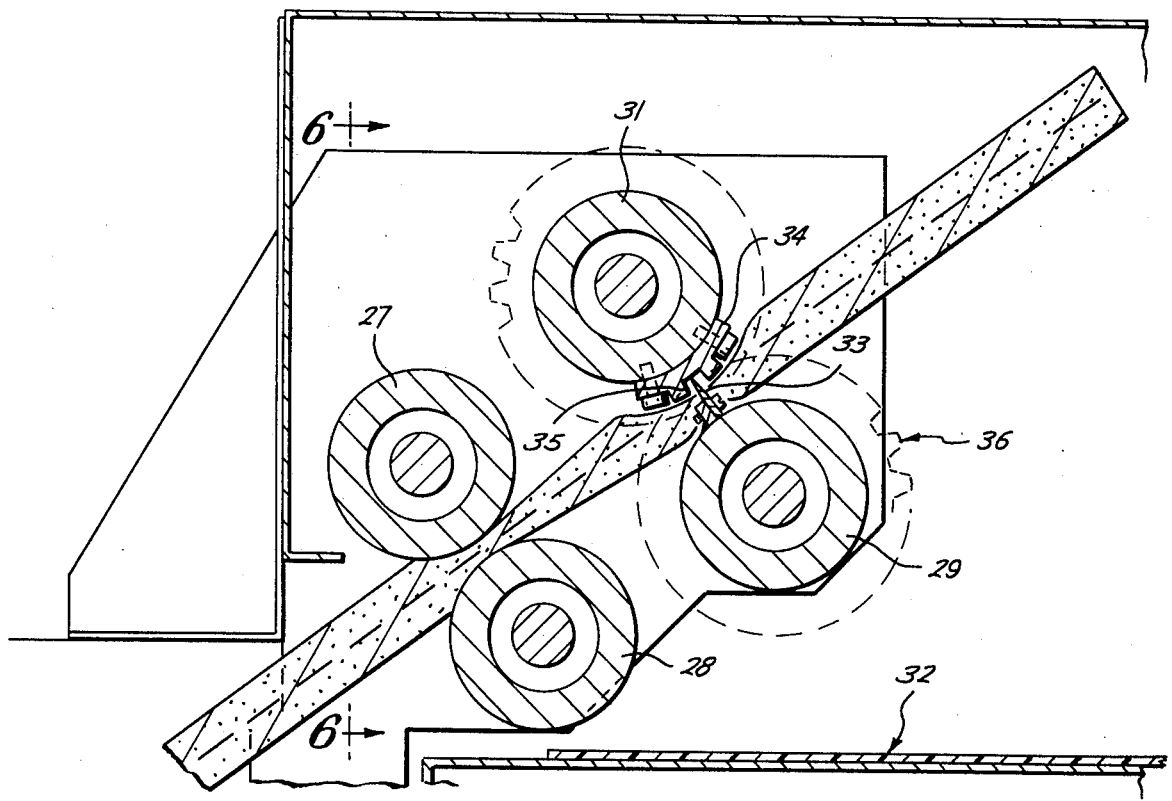
FIG. 5 is a view in section through the machine showing in elevation the chopping system and, FIG. 6 is a view along the lines 6—6 of FIG. 5.

The chopper section is best shown in FIGS. 5 and 6. The strips of board pass from the extractor through the two pinch rollers 27 and 28. These pinch rollers are rotated at the same speed as the rollers 13 and 14 in the main bed of the machine and isolate the chopping rollers from the grooving machine. It will be noted from FIG. 6 that these rollers as well as the rollers 29 and 31 extend the entire width of the machine and will receive scrap strips from any desired setting of the several cutter means.

The strips are broken into short sections by the cooperating blade roller 29 and base roller 31. The blade roller 29 has attached thereto a radially extending blade 33 for chopping the strip board as it passes through the machine. The base roller 31 has mounted thereon a member 34 having an integral slot 35 therein for receiving the blade 33. Member 34 is constructed of polyurethane, or a similar material. The rollers 29 and 31 are driven at a slightly greater speed than the rollers 27 and 28 to assist in the chopping action. The rollers 29 and 31 are of course, driven synchronously so that the blade and groove will mate each time they oppose each other. The gears indicated generally at 36 for driving the rollers 29 and 31 are conventional in form and are driven by power means not shown. Rollers 27, 28 29 and 31 are driven by a separate conventional motor and chain drive, not shown.

The conveyor indicated generally at 32 conveys the chopped scrap to one side of the machine. The conveyor belt assembly is conventional in form. Any desired form of conveyor system may be used or the conveyor system may be dispensed with and a chute utilized to collect the scrap if it is desired to assemble the scrap in a more central location than the general area below the chopping means.

From the above it will be seen that the objects of this invention have been attained. The cut strips from a board are automatically removed from the board as they are being cut and are chopped into small pieces which may be gathered in a central location for further handling. The need for manually removing each of the cut strips from the board after it is cut has been eliminated.

It will be apparent from the disclosure that the scrap chopper-extractor system may be used with any form of cutter blade such as a V-blade and the invention is not limited to the form of blade shown.

The foregoing disclosure and description of the invention is illustrative and explanatory thereof and various changes in the size, shape and materials, as well as in the details of the illustrated construction may be made within the scope of the appended claims without departing from the spirit of the invention.

What is claimed is:
1. A blade for a board cutting machine comprising,
   a section adapted to be attached to a blade support,
   a first cutting edge extending from said section toward the board being cut and toward the strip being cut at a slight angle to a plane normal to the board,
   a second cutting edge extending from said first cutting edge toward the strip being cut and parallel to the face of the board being cut,
   a third cutting edge extending from the second cutting edge toward the board being cut and toward the strip being cut at an angle slightly greater than the angle of said first cutting edge,
   and a fourth cutting edge extending from the third cutting edge toward the strip being cut and parallel to the face of the board being cut.
2. A blade assembly for a board cutting machine comprising;
   a first blade comprising,
   a section adapted to be attached to a blade support,
   a first cutting edge extending from said section toward the board being cut and toward the strip being cut at a slight angle to a plane normal to the board,
   a second cutting edge extending from said first cutting edge toward the strip being cut at an angle parallel to the face of the board being cut,
   a third cutting edge extending from the second cutting edge toward the board being cut and toward the strip being cut at an angle slightly greater than the angle of said first cutting edge,
   and a fourth cutting edge extending from the third cutting edge toward the strip being cut and parallel to the face of the board being cut;
   and a second blade comprising,
   a section adapted to be attached to a blade support,
   a cutting edge which extends toward the board being cut and toward the strip being cut at a slight angle to a plane normal to the board,
   and a second cutting edge extending from said first cutting edge toward the strip being cut and parallel to the face of the board being cut.

* * * * *